United States Patent
Pan et al.

(10) Patent No.: US 6,282,595 B1
(45) Date of Patent: Aug. 28, 2001

(54) METHOD FOR TESTING INTERFACE CARD

(75) Inventors: Cheng-Feng Pan, Taipei; Wen-Cheng Lin, Taipei Hsien, both of (TW)

(73) Assignee: Silicon Integrated Systems Corp. (CN)

( * ) Notice: Subject to any disclaimer, the term of this patent is extended or adjusted under 35 U.S.C. 154(b) by 0 days.

(21) Appl. No.: 09/128,631

(22) Filed: Aug. 4, 1998

(51) Int. Cl.⁷ .................................................. G06F 13/00
(52) U.S. Cl. ........................... 710/102; 710/10; 710/129; 713/2
(58) Field of Search .......................... 712/1; 710/102, 710/129, 10; 713/2

(56) References Cited

U.S. PATENT DOCUMENTS

| | | | |
|---|---|---|---|
| 5,483,649 | * | 1/1996 | Kuznetsov et al. ................ 713/200 |
| 5,541,862 | * | 7/1996 | Bright et al. ...................... 702/122 |
| 5,726,995 | * | 3/1998 | Wong .................................. 714/724 |
| 5,887,144 | * | 3/1999 | Guthrie et al. .................... 710/101 |

\* cited by examiner

*Primary Examiner*—Richard Hjerpe
*Assistant Examiner*—Mackly Monestime
(74) *Attorney, Agent, or Firm*—Greer, Burns & Crain, Ltd

(57) ABSTRACT

A method for testing an interface card used with a computer is provided. The method includes steps of (a) providing the computer with a read-only memorizing device for saving a testing program therein, (b) starting the computer, (c) detecting whether there exists the interface card electrically connected to the computer, (d) causing the computer to change from a first mode to a second mode when the interface card is detected, and (e) executing the testing program to test the interface card.

4 Claims, 4 Drawing Sheets

METHOD FOR TESTING INTERFACE CARD

FIELD OF THE INVENTION

The present invention is related to a method for testing an interface card, and more particularly to a method for testing a peripheral interface card used with a computer.

BACKGROUND OF THE INVENTION

Computer is commonly known at the modern age. It is impossible to overestimate the importance of computers. The popularization of computers in a country often expresses the technological development of this country. Peripheral devices of a computer such as monitor and speaker are essential parts of the computer to perform multimedia effect. Accordingly, there is a great demand for interface cards, e.g. display card or sound blaster card to communicate the computer with its peripheral devices. It is a burning question for the manufacturers of interface cards how to increase testing speed and decrease testing cost.

For instance, please refer to FIG. 1 showing how to test a 3D display card. For testing the 3D display card 13, the testing system includes a computer 11 and a monitor 12. At first, the tester inserts the 3D display card 13 onto a slot of the main board 111 of the computer 11. The main board 111 will execute a basic input/output system (BIOS) program after starting the computer 11. The basic input/output system program is used for self-testing and detecting the peripheral devices electrically connected to the computer. After the computer passes the self-test predetermined by the basic input/output system program, the boot program and operating system (Dos or Windows 95) stored in the hard disk 112 are loaded in the memory of the computer 11. Then, the tester inputs an instruction for the computer to execute a test program stored in the hard disk 112 to test the 3D display card 13. The tester may watch out for the testing result from the monitor 12. The tester must turn off the computer if he wants to test another 3D display card. After a 3D display card 13 is completely tested, the tester will withdraw the tested 3D display card 13 from the slot of the main board 111 and insert another 3D display card to be tested onto the slot of the computer 11. Then, another testing procedure including starting the computer, executing the basic input/output system program, loading the operating system, and executing the testing program is repeated to test the second 3D display card.

The conventional testing procedure for testing a 3D display card is shown in FIG. 2. It includes the following steps:

step (1): adjusting the clock of video memory of the 3D display card 13 as indicated in block 21. This step is used to decrease the noises which will seriously affect the testing result.

step (2): testing the video memory of the 3D display card as indicated in block 22.

step (3): testing the 2D engine of the 3D display card as indicated in block 23.

step (4): testing the 3D engine of the 3D display card as indicated in block 24.

step (5): restoring the original clock for the video memory as indicated in block 25.

step (6): testing the register group of the 3D display card as indicated in block 26. This step is used to check the register index.

step (7): testing the display mode of the 3D display card as indicated in block 27. Different refresh rates are used in response to different display modes to test the display states.

Step (8): showing the testing report as indicated in block 28.

However, the aforementioned testing method using the testing program stored in the hard disk is not practicable. Each testing cycle, including steps of switching on the computer, loading the operating system such as Windows 95, and completely testing the 3D display card, spends much time. The total spent time approximates 90 seconds. The testing period is so long to seriously affect the productivity. Another drawback of the conventional testing method is the damage of the hard disk caused by frequent switch. The switch between on-state and off-state with considerable frequency will result in a reduced lifetime of the hard disk. The average market cost of a hard disk is about NT$ 4,000. A hard disk can only perform 5,000 to 10,000 testing cycles. Hence, the production cost of 3D display cards can not be lowered.

Another testing system for testing a 3D display card is developed to solve the aforementioned problem. Please refer to FIG. 3 which shows another conventional testing system for testing a 3D display card. The hard disk is replaced by a read-only memory (ROM) card 312. The testing system includes a computer 31 and a monitor 32. The testing method is similar to the aforementioned one. The tester inserts the 3D display card 33 onto a slot of the main board 311 of the computer 31. The main board 311 executes the basic input/output system program after starting the computer 31. When the 3D display card 33 is detected, the testing program recorded in the read-only memory card 312 gains the master control over other programs. The testing program is executed to test the 3D display card 33. The testing result is also shown on the monitor 32. Then, the entire testing method is repeated to test other 3D display cards.

Such testing method can speed up the testing procedure because testing the 3D display card need not load the operating system. The average cost of a read-only memory card is about NT$ 100. The card employs an electrically erasable programmable read-only memory (EEPROM) which is rewritable and serviceable. Therefore, the production cost including testing cost is lowered. However, the capacity of the read-only memory card is much less than that of the hard disk. Some big testing programs can not be stored in the read-only memory card. For example, a 3D pattern used for testing the 3D engine is too big to be stored in the read-only memory card. Hence, the testing procedure can not be completed by just using the read-only memory card. It will affect the yield of the 3D display cards.

SUMMARY OF THE INVENTION

An objective of the present invention is to provide a cost-effective method for testing an interface card.

Another objective of the present invention is to provide a fast method for completely testing an interface card.

Another further objective of the present invention is to provide a method for testing an interface card without lowering the yield.

In accordance with the present invention, a method for testing an interface card used with a computer includes steps of (a) providing the computer with a read-only memorizing device for saving a testing program therein, (b) starting the computer, (c) detecting whether there exists the interface card electrically connected to the computer, (d) causing the computer to change from a first mode to a second mode when the interface card is detected, and (e) executing the testing program to test the interface card.

In accordance with another aspect of the present invention, the read-only memorizing device is preferably a read-only memory card including electrically erasable programmable read-only memories.

In accordance with another aspect of the present invention, the detecting step (c) is preferably executed by running a basic input/output system program. The basic input/output system program can self-test and detect other peripheral devices electrically connected to the computer.

In accordance with another aspect of the present invention, the step (d) preferably includes steps of (d1) detecting a version of the basic input/output system program, (d2) saving an initial address of an interrupt vector of the computer, (d3) assigning a specific address to the interrupt vector of the computer in response to the version of the basic input/output system program, (d4) restoring the initial address for the interrupt vector of the computer, and (d5) loading the testing program into a conventional memory of the computer. The interrupt vector mentioned in steps (d2), (d3), and (d4) is 10h when the basic input/output system is manufactured by AMI. Alternatively, the interrupt vector should be 09h when the basic input/output system is manufactured by Award.

In accordance with another aspect of the present invention, the first mode and the second mode is a normal mode and a turbo mode respectively.

In accordance with another aspect of the present invention, the interface card may be a 3D display card or a sound blaster card. If the interface card is a 3D display card, the testing step (e) includes steps of (e1) changing an initial clock of a video memory of the 3D display card into a specific clock to decrease noises which will influence the testing accuracy, (e2) testing the video memory, (e3) testing a 2D engine of the 3D display card, (e4) testing a 3D engine of the 3D display card, (e5) restoring the initial clock for the video memory, (e6) testing a register group of the 3D display card, (e7) testing a display mode of the 3D display card, and (e8) showing a testing result.

In accordance with another aspect of the present invention, the step (e2) of testing the video memory includes steps of (e21) assigning a first data to the video memory, (e22) reading out the first data from the video memory and debugging the video memory according to the read first data, (e23) assigning a second data to the video memory, (e24) logically calculating the first data and the second data to obtain an logical result, and (e25) reading out the logical result from the video memory and debugging the video memory according to the read logical result.

In accordance with the present invention, a method for testing an interface card used with a computer includes steps of (a) providing the computer with an electric memorizing device saving a testing program therein, (b) starting the computer, (c) detecting whether there exists the interface card electrically connected to the computer, (d) causing the computer to change from a first mode to a second mode when the interface card is detected, (e) loading the testing program into a memory of the computer, and (f) executing the testing program loaded in the memory to test the interface card.

In accordance with another aspect of the present invention, the memory is preferably a conventional memory.

The present invention may best be understood through the following description with reference to the accompanying drawings, in which:

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Figure 3:
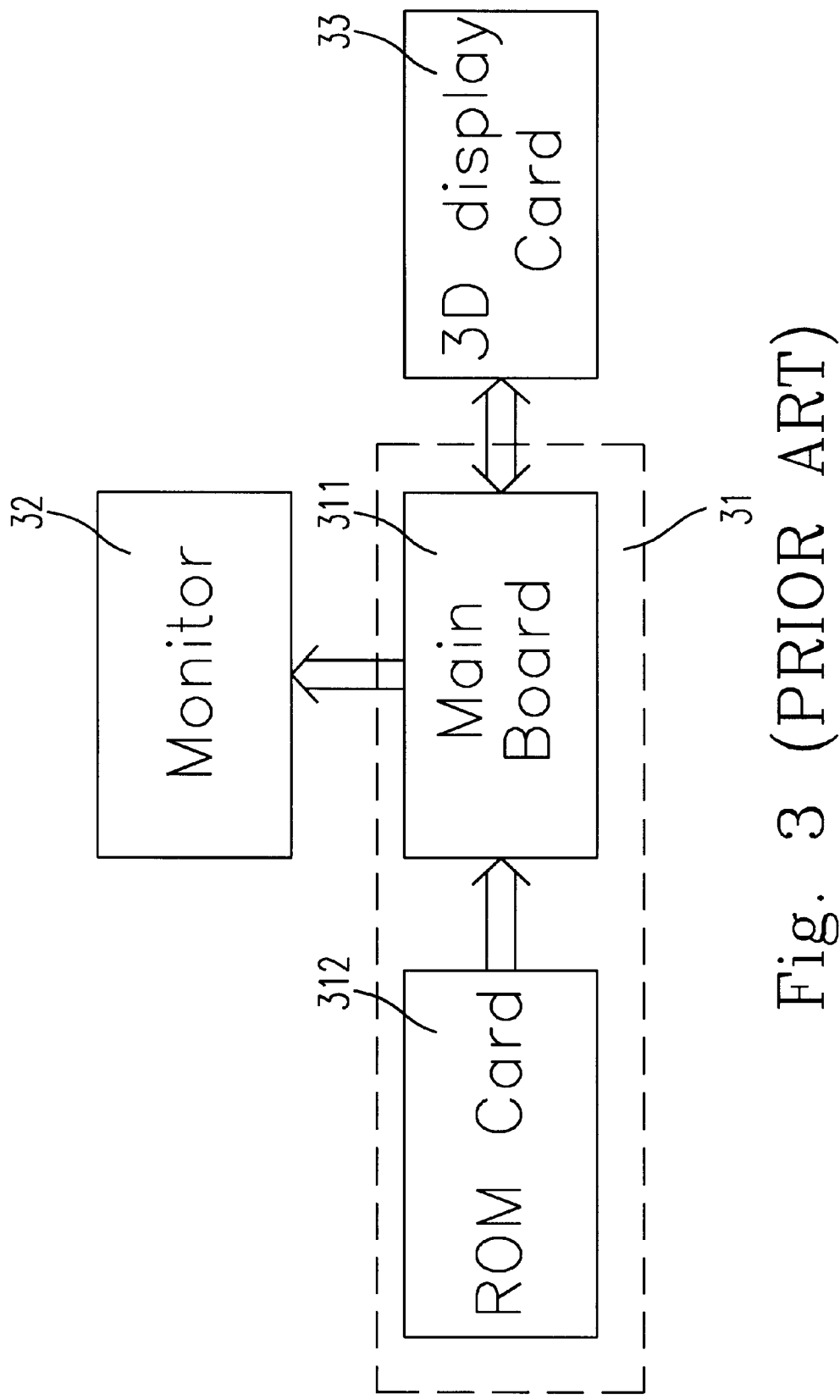
FIG. 3 is a block diagram showing another conventional testing system for testing a 3D display card.
Figure 4:
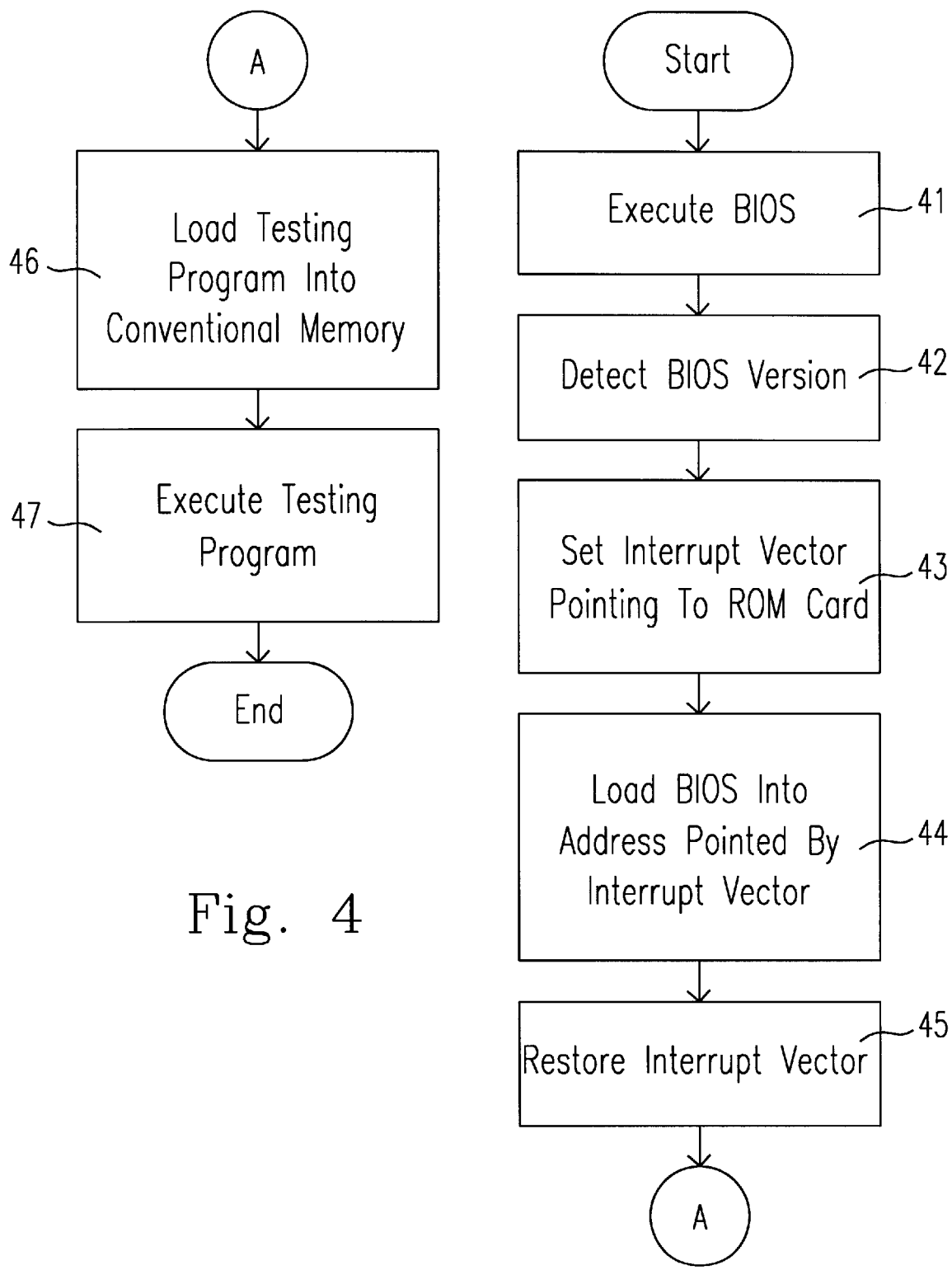
FIG. 4 is a flowchart showing a preferred embodiment of a testing method for testing a 3D display card according to the present invention.

Please refer to FIG. 4 which is a flowchart showing a preferred embodiment of a testing method for testing a 3D display card according to the present invention. The testing system is the same as one shown in FIG. 3. At first, the tester inserts the 3D display card onto a slot of the main board of the computer. As shown in block 41, the main board executes the basic input/output system program to self-test and detect the peripheral devices electrically connected to the computer upon starting the computer. Certainly, the read-only memory card including electrically erasable programmable read-only memories is mounted on the main board beforehand. When the read-only memory card is detected, the testing program recorded in the read-only memory card becomes the master control program. This is not the moment to test the 3D display card because the computer is not in a turbo mode. The testing speed is very slow if the computer is not in a turbo mode according to the conventional testing procedure. As shown in block 42, the read-only memory card will detect the version of the basic input/output system program instead because the interrupt vector which makes the computer be in the turbo mode varies according to the versions of the basic input/output system programs. For example, the most used versions provided by AMI and Award have different interrupt vectors to denote the turbo mode. The former has an interrupt vector of 10h, but the later has an interrupt vector of 09h.

As shown in block 43, if the version of the basic input/output system program belongs to AMI, the testing program assigns an address, which points to the program saved in the read-only memory card, to the interrupt vector 10h. Meanwhile, the basic input/output system program gains the master control over other programs. As shown in block 44, when the basic input/output system program is loaded into the address pointed by the interrupt vector 10h, the testing program recorded in the read-only memory card gains the master control over other programs again. It is certain that the computer is in the turbo mode. The testing procedure is certainly speeded up. Then, as shown in block 45, the interrupt vector 10h returns to the original state. As shown in block 46, the conventional memory loads the testing program from the read-only memory. It can speed up the testing procedure. By the same token, if the version of the basic input/output system program belongs to Award, the procedure is similar to that described above, except that the interrupt vector 10h is replaced by the interrupt vector 09h. At last, the testing program loaded in the conventional memory is executed to test the 3D display card as shown in block 47.

Figure 1:
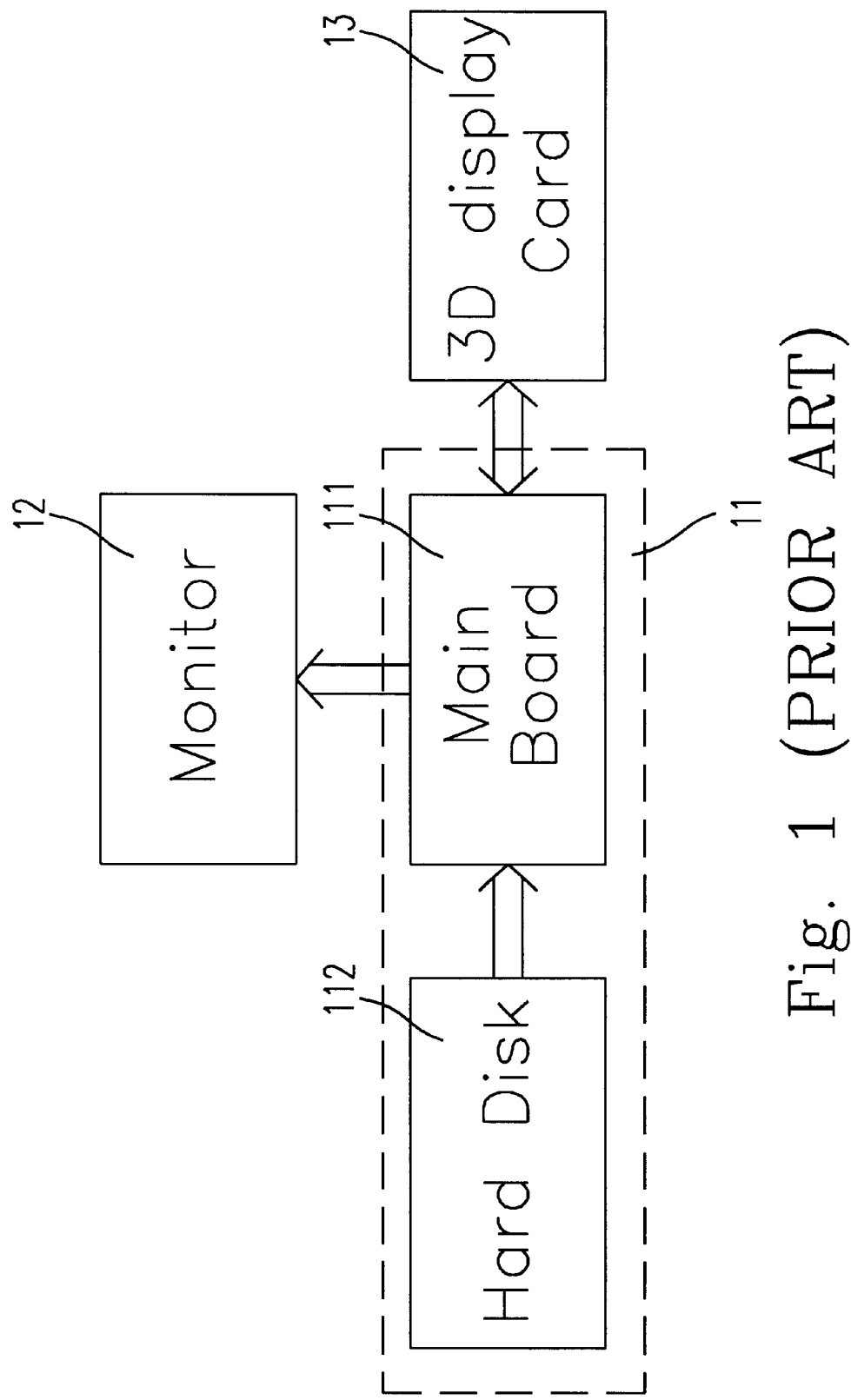
FIG. 1 is a block diagram showing a conventional testing system for testing a 3D display card.
Figure 2:
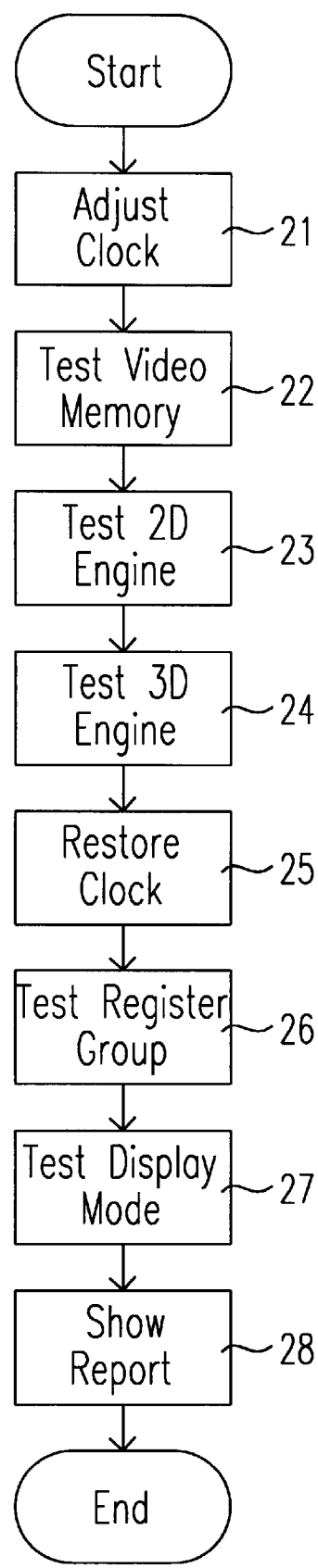
FIG. 2 is a flowchart showing a conventional testing method for testing a 3D display card.

The testing steps as shown in FIG. 2 is somewhat modified to perform a better testing procedure. The modified steps includes the step (2) of testing the video memory and the step (4) of testing the 3D engine. The conventional method for testing the video memory of the 3D display card is to assign some hexadecimal data with opposite polarities such as 55, AA, 00, and FF to the video memory. The data is then read out later. The step makes the video memory charge and discharge alternately to test the continuity of the video memory, but it can not detect the leakage current. The present invention provides a better step. After assigning the first data such as 0001 0002 0003 0004 to the video memory, the first data is read out and error-detected immediately. Then, the video memory executes' a NOT logic operation of the first data, and the operated result is read out and debugged immediately. Next, the video memory executes an XOR logic operation between the first data and the second data such as 5555. . . . The operated result is read out and error-detected immediately. Then, the video memory executes another XOR logic operation between the first data and the third data such as AAAA. . . . The operated result is read out and debugged immediately. Such steps can not only test the continuity of the video memory, but also detect the leakage current.

The conventional method for testing the 3D engine of the 3D display card is to directly load a 3D testing pattern in the 3D engine. However, the file storing the 3D pattern is too big to fit into the read-only memory card. The present invention takes advantage of a pattern function which will generate the 3D pattern for testing the 3D engine. The file for storing the pattern function is much smaller than that for storing the 3D pattern. The pattern function can be easily stored in the read-only memory card to perform the 3D engine testing. As for other testing steps, they are the same as those described above and are not tautologized again.

In conclusion, the present method for testing a 3D display card can speed up the testing procedure. The testing program is also minimized without affecting the testing effect. The method can be applied to test not only a 3D display card, but also other various kinds of interface cards such as sound blaster card. The most important aspect is to change the computer from a normal mode to a turbo mode before executing the testing program. Hence, the spent time of testing an interface card can be decreased significantly. The productivity is hence increased very much.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the boardest interpretation so as to encompass all such modifications and similar structures.

What is claimed is:

1. A method for testing a 3D display card used with a computer, comprising:
   (a) providing a computer with a read-only memorizing device for saving a testing program therein;
   (b) starting said computer;
   (c) detecting whether there exists said interface card electrically connected to said computer;
   (d) causing said computer to change from a normal mode to a turbo mode when said interface card is detected; and
   (e) executing said testing program to test said display card, said step further comprising:
      (e1) changing an initial clock of a video memory of said 3D display card into a specific clock to decrease noises;
      (e2) testing said video memory;
      (e3) testing a 2D engine of said 3D display card;
      (e4) testing a 3D engine of said 3D display card; and
      (e5) restoring said initial clock for said video memory;
   said step of testing said video memory further comprising:
      (e21) assigning a first data to said video memory;
      (e22) reading out said first data from said video memory and debugging said video memory according to said read first data;
      (e23) assigning a second data to said video memory;
      (e24) logically calculating said first data and said second data to obtain a logical result; and
      (e25) reading out said logical result from said video memory and debugging said video memory according to said read logical result.

2. A method for executing a testing program to test a 3-D display card, comprising the steps of:
   (a) changing an initial clock of a video memory of said 3-D display card into a specific clock to decrease noises;
   (b) assigning a first data to said video memory;
   (c) reading out said first data from said video memory and debugging said video memory according to said read first data;
   (d) assigning a second data to said video memory;
   (e) logically calculating said first data and said second data to obtain a logical result;
   (f) reading out said logical result from said video memory and debugging said video memory according to said read logical result;
   (g) testing a 2-D engine of said 3-D display card;
   (h) testing a 3-D engine of said 3-D display card; and
   (i) restoring said initial clock for said video memory.

3. The method according to claim 2 wherein step (h) is executed by a test pattern generated by a pattern function.

4. A method for testing a video memory of an interface card, comprising the steps of:
   (a) assigning a first data to said video memory;
   (b) reading out said first data from said video memory and debugging said video memory according to said read first data;
   (c) assigning a second data to said video memory;
   (d) logically calculating said first data and said second data to obtain a logical result; and
   (e) reading out said logical result from said video memory and debugging said video memory according to said read logical result.

* * * * *